US006527973B2

(12) United States Patent
Ohido et al.

(10) Patent No.: US 6,527,973 B2
(45) Date of Patent: Mar. 4, 2003

(54) MAGNETIC GARNET MATERIAL AND MAGNETOOPTICAL DEVICE USING THE SAME

(75) Inventors: Atsushi Ohido, Nihonbashi (JP); Kazuhito Yamasawa, Nihonbashi (JP)

(73) Assignee: TDK Corporation, Tokyo (JP)

( * ) Notice: Subject to any disclaimer, the term of this patent is extended or adjusted under 35 U.S.C. 154(b) by 2 days.

(21) Appl. No.: 09/733,039

(22) Filed: Dec. 11, 2000

(65) Prior Publication Data

US 2002/0014612 A1 Feb. 7, 2002

(30) Foreign Application Priority Data

Feb. 22, 2000 (JP) ....................................... 2000-043978

(51) Int. Cl.[7] .................................................. G02F 1/09
(52) U.S. Cl. ................................ 252/62.57; 252/62.59; 252/62.58; 117/945
(58) Field of Search ....................... 117/945; 252/62.57, 252/62.58, 62.54

(56) References Cited

U.S. PATENT DOCUMENTS

| | | | | |
|---|---|---|---|---|
| 4,295,988 A | * 10/1981 | Nelson et al. | .............. | 252/584 |
| 5,466,388 A | 11/1995 | Fuji et al. | ................ | 252/62.59 |
| 5,616,176 A | * 4/1997 | Fukuda et al. | ................ | 117/54 |
| 5,691,837 A | * 11/1997 | Itoh et al. | ................ | 252/62.57 |

FOREIGN PATENT DOCUMENTS

| | | | |
|---|---|---|---|
| EP | 521527 | * | 1/1993 |
| JP | 61-20926 | * | 1/1986 |
| JP | 62-7634 | * | 1/1987 |
| JP | 62-105931 | | 5/1987 |
| JP | 3-69847 | | 11/1991 |
| JP | 6-263448 | | 9/1994 |
| JP | 10-72296 | * | 3/1998 |
| JP | 11-236296 | * | 8/1999 |

* cited by examiner

*Primary Examiner*—C. Melissa Koslow
(74) *Attorney, Agent, or Firm*—Oliff & Berridge, PLC.

(57) ABSTRACT

A magnetooptical device which defines a Faraday rotation angle $\theta$ expressed by 44 deg.$\leqq\theta\leqq$46 deg. when light having a wavelength $\lambda$ (1570 nm$\leqq\lambda\leqq$1620 nm) impinges thereupon. A magnetic garnet material expressed by a general formula: $Bi_aM1_{3-a}Fe_{5-b}M2_bO_{12}$ is used. M1 is at least one kind of element that is selected from among Y, La, Eu, Gd, Ho, Yb, Lu and Pb; M2 is at least one kind of element that is selected from among Ga, Al, Ti, Ge, Si and Pt; and a and b satisfy 1.0$\leqq$a$\leqq$1.5 and 0$\leqq$b$\leqq$0.5, respectively.

4 Claims, No Drawings

MAGNETIC GARNET MATERIAL AND MAGNETOOPTICAL DEVICE USING THE SAME

BACKGROUND OF THE INVENTION:

1. Field of the Invention

The present invention relates to a Bi (bismuth)-substituted rare earth iron garnet single crystal material that is a magnetic garnet material. The present invention also relates to a magnetooptical device utilizing a magnetooptical effect provided by the use of a magnetic garnet material and, more particularly, to a Faraday rotator.

2. Description of the Related Art

Conventional optical communication has been established by communication systems utilizing light having a single wavelength such as 1310 nm or 1550 nm. Since optical isolators which are optically passive components used in conventional optical communication systems are used at a single wavelength as described above, Faraday rotators which are magnetooptical devices forming a part of optical isolators are also developed such that they exhibit good characteristics at a single wavelength such as 1310 nm or 1550 nm. For example, Japanese examined patent publication (KOKOKU) No. H3-69847 (1991) has disclosed a Bi-substituted rare earth iron garnet single crystal material which includes Tb (terbium). Temperature characteristics of a Faraday rotator can be improved by fabricating it using the magnetic garnet material. For this reason, optical isolators utilizing Faraday rotators primarily constituted by Tb are widely used in optical communication systems.

The recent spread of the internet has dramatically increased the amount of communication over communication lines. Proposals have been made for optical wavelength division multiplex communication systems (hereinafter referred to as "WDM communication systems") in which a plurality of optical signals having different wavelengths are simultaneously transferred over a single optical fiber. An optical amplifier used in a WDM communication system directly amplifies an optical signal using an erbium-doped fiber as an amplifying medium. In the case of a WDM communication system, for example, a plurality of optical signals having different wavelengths within the L-waveband (wavelengths in the range from 1570 nm to 1620 nm) are transferred.

Under such circumstances, optically passive components such as optical isolators, optical attenuators and composite optical modules must have high magnetooptical characteristics in wavebands higher than the wavelength of 1550 nm according to the prior art. However, Faraday rotators fabricated using a Bi-substituted rare earth iron garnet single crystal including Tb have a significant insertion loss at wavebands longer than 1550 nm. Therefore, optically passive components constituted by a Faraday rotator including Tb have had a great insertion loss in the case of light in wavebands longer than 1550 nm.

It is therefore difficult to satisfy an insertion loss characteristic of 0.1 dB or less required in the L-waveband used for WDM communication systems with Faraday rotators which are primarily constituted by Tb.

The output of a light source must therefore be increased in order to maintain a predetermined quantity of light in an optical communication system, and this results in a problem in that the cost of the optical communication system is increased.

Further, since the Faraday rotation coefficient (deg./μm) decreases as the wavelength of light increases, a Faraday rotator fabricated using a Bi-substituted rare earth iron garnet single crystal material must have a large thickness in order to achieve a Faraday angle of 45 deg. required for the same. For this reason, the thickness required for a Faraday rotator of an optical isolator used in a waveband such as the L-waveband for WDM communication systems which is longer than conventionally used wavelengths is greater than that of rotators used at a single wavelength of 1550 nm. This has resulted in a problem in that a great number of cracks occur during the growth of a single crystal film or during lapping of the same into a Faraday rotator, thereby causing a reduction of yield.

SUMMARY OF THE INVENTION

It is an object of the invention to provide a magnetic garnet material which is less likely to crack during the growth of a single crystal film or during lapping of the same.

It is another object of the invention to provide a magnetooptical device which defines a Faraday rotation angle θ expressed by 44 deg.$\leqq\theta\leqq$46 deg. when light having a predetermined wavelength λ (1570 nm$\leqq\lambda\leqq$1620 nm) impinges thereupon, and which is less likely to crack during processing in order to permit the suppression of a reduction of yield.

The above-described object is achieved by a magnetic garnet material characterized in that it is expressed by a general formula: $Bi_aM1_{3-a}Fe_{5-b}M2_bO_{12}$.

M1 is at least one kind of element that is selected from among Y, La, Eu, Gd, Ho, Yb, Lu and Pb. M2 is at least one kind of element that is selected from among Ga, Al, Ti, Ge, Si and Pt; and "a" and "b" satisfy $1.0\leqq a\leqq 1.5$ and $0\leqq b\leqq 0.5$, respectively.

A magnetic garnet material according to the invention as described above is characterized in that the material is grown by liquid phase epitaxial growth method.

The above-described object is achieved by a magnetooptical device has a Faraday rotation angle θ expressed by 44 deg.$\leqq\theta\leqq$46 deg. when light having a predetermined wavelength λ (1570 nm$\leqq\lambda\leqq$1620 nm) impinges thereupon, characterized in that it is formed of a magnetic garnet material according the invention as described above.

A magnetooptical device according to the invention as described above is characterized in that it has an insertion loss of 0.1 dB or less when light having the wavelength λ impinges thereupon.

DESCRIPTION OF THE PREFERRED EMBODIMENTS

The inventors have studied a composition of garnet based on the following conditions.

(1) It must satisfy the requirement for an insertion loss of 0.1 dB which must be commonly satisfied by a Faraday rotator in the L-waveband (from 1570 nm to 1620 nm) which is longer than 1550 nm.

(2) A single crystal is to be obtained which is less likely to crack during the growth of the epitaxial film or the processing of the same into a Faraday rotator.

As a result, it was found that it is very advantageous to use Y, La, Eu, Gd, Ho, Yb or Lu as the rare earth element and to keep the amount of Bi within the range of 1.0 to 1.5.

Tb greatly contributes to improvement of the temperature coefficient (deg./° C.) of a Faraday rotator, and also contributes to improvement of the wavelength coefficient (deg./nm) near the wavelength of 1550 nm, and it is an element which is effective in improving the characteristics of an optical isolator. Therefore, it has been used as a primary element of Faraday rotators. However, Tb has a peak of light absorption around 1800 nm, which is a wavelength larger than 1550 nm. As a result, an insertion loss of a Faraday rotator utilizing Tb as a primary element attributable to light absorption increases as the wavelength becomes larger than approximately 1550 nm, and it is no longer possible to satisfy the requirement of an insertion loss characteristic of 0.1 dB for a Faraday rotator in the case of light having a wavelength longer than 1570 nm.

Under such circumstances, studies were made to find a composition which absorbs less light at such wavebands and which can keep the insertion loss of a Faraday rotator at 0.1 dB or less even when it is used as a primary element of the same. As a result, it was revealed that the elements Y, La, Eu, Gd, Ho, Yb and Lu absorb less light at wavelengths around 1550 nm, and that the insertion loss is kept at 0.1 dB or less in the waveband from 1570 to 1620 nm when these elements are used. Since the light absorption of these elements is significantly smaller than that of Tb in the L-band, it is considered that the insertion loss can be kept at 0.1 dB or less.

The insertion loss characteristic of 0.1 dB or less was also achieved in the L-band (from 1570 to 1620 nm) even when adding an element such as Ga, Al, Ti, Ge or Si. While these are substituted for Fe with reducing the Faraday rotation coefficient (deg./μm), they are effective in suppressing a saturation magnetic field of a rotor; it is therefore possible to make an optical isolator compact, because the outer magnet can be made small. However, an increase in the amount of substituted Fe decreases the Faraday rotation coefficient (deg./μm), and therefore results in an increase in the thickness required to achieve the Faraday rotation angle of 45 deg, which can be a cause of cracks. An appropriate amount for the substitution of these elements is therefore 0.5 or less.

The Faraday rotation coefficient (deg./μm) of a Bi-substituted rare earth iron garnet material becomes smaller the larger the wavelength of light, and a Faraday rotator used for light in the L-band (1570 to 1620 nm) has a thickness greater than that of a part used for light having a wavelength of 1550 nm in order to achieve the Faraday rotation angle of 45 deg. When a Bi-substituted rare earth iron garnet single crystal is grown using a liquid phase epitaxial (LPE) method, a single crystal wafer which is primarily constituted by Gd and Ga is commonly used as the substrate.

For example, when a magnetic garnet single crystal film is formed using the LPE method, a gadolinium gallium garnet (hereinafter referred to as "GGG") single crystal substrate doped with Ca, Zr and Mg is used. Since the GGG substrate doped with Ca, Zr and Mg and the magnetic garnet single crystal film have different compositions, the substrate and epitaxial film have different thermal expansion coefficients. The thermal expansion coefficient of the epitaxial film is greater than that of the substrate. This is the reason for the occurrence of cracks during the growth and cooling of the epitaxial film. The rate of occurrence of cracks dramatically increases especially when the thickness of the epitaxial film increases. Since Faraday rotators used at wavelengths larger than the wavelength of 1550 nm must have a greater thickness, it is difficult to manufacture such rotators with a high yield due to an increase in the frequency of cracks.

This results in a need for decreasing the thickness of a rotator by enlarging the Faraday rotation coefficient (deg./μm). While the Faraday coefficient can be increased by increasing the amount of Bi in the composition of the epitaxial film, a change in the amount of Bi in the expitaxial film results in a change in the thickness at which cracks occur, because the thermal expansion coefficient of the film also changes. Thus, a study was made regarding possible compositions of a Bi-substituted rare earth iron garnet single crystal which do not cause any cracks at each of the steps of growing, cooling and lapping an epitaxial film having a thickness which is the sum of the thickness of a Faraday rotator and a thickness required for the lapping process.

When the amount of Bi in a composition formula of garnet was 1.0 or less, cracks occurred during growing and lapping processes intended for a film thickness required for fabricating a Faraday rotator to be used in the L-band (1570 nm to 1620 nm).

Further, since the LPE method causes deposition such that a liquid phase in an over-saturated state is epitaxially grown into a solid phase on a substrate, the possibility of deposition of a solid phase other than an epitaxial film always remains. When such a solid phase is deposited, a problem occurs in that defects can occur on the surface of an epitaxial film or in that the growing rate is significantly reduced.

When it was intended to grow an epitaxial film including Bi in an amount of 1.5 or more as expressed in the composition formula of garnet, the over-saturated state of the material fusing agent became unstable, and deposition of iron garnet occurred in the fusing agent in addition to epitaxial growth. As a result, a thickness required for fabrication of a Faraday rotator could not be achieved, and cracks and crystal defects occurred during the growth.

The above-described results of the study revealed that a Faraday rotator to be used in the L-band can be fabricated with a reduced possibility of cracks at each step by keeping the amount of Bi in the composition formula of garnet within the range from 1.0 to 1.5.

Referring to an optical isolator as an example of a magnetooptical device, the rotation angle of the Faraday rotator therefore must be 45 deg. in order to eliminate return light, and isolation characteristics are deteriorated if the Faraday rotation angle deviates from 45 deg. The Faraday rotation angle must be kept in the range from 44 to 46 deg. to maintain sufficient isolation. Therefore, in order to configure an optical isolator for the L-band, the Faraday rotation angle must be within the range of 44 to 46 deg. in the same band.

EXAMPLES

As described above, when a magnetooptical device is fabricated using a Bi-substituted rare earth iron garnet single crystal material in which Y, La, Eu, Gd, Ho, Yb or Lu is used as the rare earth element and in which the amount of Bi is within the range of 1.0 to 1.5, it is possible to suppress the occurrence of cracks during the growth of the single crystal film and a lapping process on the same, and to achieve the insertion loss characteristic of 0.1 dB or less in the waveband from 1570 to 1620 nm.

A description will now be made on examples 1 through 4 and comparative examples 1 through 3 as specific embodiments of a magnetic garnet material and a magnetooptical device utilizing the same according to the invention, with reference to Table 1.

Example 1

3.315 g. of $Gd_2O_3$, 8.839 g. of $Yb_2O_3$, 43.214 g. of $B_2O_3$, 173.74 g. of $Fe_2O_3$, 1189.6 g. of PbO, 826.4 g. of $Bi_2O_3$ and 5.121 g. of $GeO_2$ were weighed and put in a Pt crucible; they were thereafter fused at approximately 1000° C. and stirred to be homogenized; the temperature was decreased at 120° C./h (hour) and stabilized in an over-saturated state at 815° C. Then, a CaMgZr-substituted GGG single crystal substrate having a diameter of two inches was rotated for 40 hours at 100 rotations/minute (r.p.m) to cause liquid phase epitaxial growth of a magnetic garnet single crystal film, which provided a single crystal film having a thickness of 505 μm. The surface of the magnetic garnet single crystal film was in a mirror state, and no crack had occurred on the same.

The resultant single crystal film had a composition expressed by $Bi_{1.20}Gd_{0.78}Yb_{0.98}Pb_{0.04}Fe_{4.96}Ge_{0.02}Pt_{0.02}O_{12}$, as shown in Table 1 when analyzed using the fluorescent X-ray method. A Faraday rotator to be used for light having a wavelength of 1600 nm was fabricated by lapping the magnetic garnet single crystal film such that it would have a Faraday rotation angle of 45 deg. for light having a wavelength of 1600 nm, by attaching non-reflective films on both sides thereof, and by cutting it into 3 mm squares. No crack occurred on the single crystal film in either the lapping process or the cutting process. An evaluation of the Faraday rotation coefficient, insertion loss and the temperature characteristic of the Faraday rotator indicated that it had a thickness of 400 μm, a Faraday rotation coefficient of 0.1125 deg./μm, an insertion loss of 0.10 dB at the maximum and 0.06 dB at the minimum, and a temperature characteristic of 0.066 deg./° C.

Example 2

6.149 g. of $Eu_2O_3$, 8.245 g. of $Lu_2O_3$, 43.214 g. of $B_2O_3$, 0.614 g. of $La_2O_3$, 156.40 g. of $Fe_2O_3$, 1189.6 g. of PbO, 826.4 g. of $Bi_2O_3$ and 3.530 g. of $TiO_2$ were weighed and put in a Pt crucible; they were fused at approximately 1000° C. and stirred to be homogenized; the temperature was decreased at 120° C./h and stabilized in an over-saturated state at 820° C. Then, a CaMgZr-substituted GGG single crystal substrate having a diameter of two inches was rotated for 48 hours at 100 r.p.m to cause liquid phase epitaxial growth of a magnetic garnet single crystal film, which provided a single crystal film having a thickness of 545 μm. The surface of the magnetic garnet single crystal film was in a mirror state, and no crack had occurred on the same.

The resultant single crystal film had a composition expressed by $Bi_{1.00}Eu_{1.08}Lu_{0.83}La_{0.05}Pb_{0.04}Fe_{4.96}Ti_{0.02}Pt_{0.02}O_{12}$, as shown in Table 1 when analyzed using the fluorescent X-ray method. A Faraday rotator to be used for light having a wavelength of 1620 nm was fabricated by lapping the magnetic garnet single crystal film such that it would have a Faraday rotation angle of 45 deg. for light having a wavelength of 1620 nm, by attaching non-reflective films on both sides thereof, and by cutting it into 3 mm squares. No crack occurred on the single crystal film either in the lapping process or the cutting process. An evaluation of the Faraday rotation coefficient, insertion loss and the temperature characteristic of the Faraday rotator indicated that it had a thickness of 455 μm, a Faraday rotation coefficient of 0.0989 deg./μm, an insertion loss of 0.10 dB at the maximum and 0.07 dB at the minimum, and a temperature characteristic of 0.062 deg./° C.

Example 3

3.560 g. of $Ho_2O_3$, 4.241 g. of $Y_2O_3$, 3.416 g. of $Lu_2O_3$, 43.214 g. of $B_2O_3$, 190.70 g. of $Fe_2O_3$, 1189.6 g. of PbO, 826.4 g. of $Bi_2O_3$ and 5.598 g. of $SiO_2$ were weighed and put in a Pt crucible; they were thereafter fused at approximately 1000° C. and stirred to be homogenized; the temperature was decreased at 120° C./h and stabilized in an over-saturated state at 805° C. Then, a CaMgZr-substituted GGG single crystal substrate having a diameter of two inches was rotated for 35 hours at 100 r.p.m to cause liquid phase epitaxial growth of a magnetic garnet single crystal film, which provided a single crystal film having a thickness of 430 μm. The surface of the magnetic garnet single crystal film was in a mirror state, and no crack had occurred on the same.

The resultant single crystal film had a composition expressed by $Bi_{1.40}Ho_{0.45}Y_{0.51}Lu_{0.60}Pb_{0.04}Fe_{4.96}Si_{0.02}Pt_{0.02}O_{12}$, as shown in Table 1, when analyzed using the fluorescent X-ray method. A Faraday rotator to be used for light having a wavelength of 1570 nm was fabricated by lapping the magnetic garnet single crystal film such that it would have a Faraday rotation angle of 45 deg. for light having a wavelength of 1570 nm, attaching non-reflective films on both sides thereof, and cutting it into 3 mm squares. No crack occurred on the single crystal film either in the lapping process or the cutting process. An evaluation on the Faraday rotation coefficient, insertion loss and temperature characteristic of the Faraday rotator indicated that it had a thickness of 330 μm, a Faraday rotation coefficient of 0.1364 deg./μm, an insertion loss of 0.09 dB at the maximum and 0.05 dB at the minimum and a temperature characteristic of 0.070 deg./° C.

Example 4

5.178 g. of $Ho_2O_3$, 5.300 g. of $Y_2O_3$, 43.214 g. of $B_2O_3$, 177.35 g. of $Fe_2O_3$, 9.401 g. of $Ga_2O_3$, 3.409 g. of $Al_2O_3$, 1189.6 g. of PbO, 826.4 g. of $Bi_2O_3$ and 5.850 g. of $GeO_2$ were weighed and put in a Pt crucible; they were fused at approximately 1000° C. and stirred to be homogenized; the temperature was decreased at 120° C./h and stabilized in an over-saturated state at 801° C. Then, a CaMgZr-substituted GGG single crystal substrate having a diameter of two inches was rotated for 40 hours at 100 r.p.m to cause liquid phase epitaxial growth of a magnetic garnet single crystal film, which provided a single crystal film having a thickness of 465 μm. The surface of the magnetic garnet single crystal film was in a mirror state, and no crack had occurred on the same.

The resultant single crystal film had a composition expressed by $Bi_{1.50}Ho_{0.75}Y_{0.71}Pb_{0.04}Fe_{4.46}Ga_{0.30}Al_{0.20}Ge_{0.02}Pt_{0.02}O_{12}$, as shown in Table 1, when analyzed using the fluorescent X-ray method. A Faraday rotator to be used for light having a wavelength of 1570 nm was fabricated by lapping the magnetic garnet single crystal film such that it would have a Faraday rotation angle of 45 deg. for light having a wavelength of 1570 nm, attaching non-reflective films on both sides thereof, and cutting it into 3 mm squares. No crack occurred on the single crystal film in either the lapping process or the cutting process. An evaluation of the Faraday rotation coefficient, insertion loss and the temperature characteristic of the Faraday rotator indicated that it had a thickness of 360 μm, a Faraday rotation coefficient of 0.1268 deg. /μm, an insertion loss of 0.10 dB at the maximum and 0.08 dB at the minimum, and a temperature characteristic of 0.082 deg./° C.

Comparative Example 1

4.446 g. of $Tb_2O_3$, 7.645 g. of $Yb_2O_3$, 43.214 g. of $B_2O_3$, 173.74 g. of $Fe_2O_3$, 1189.6 g. of PbO, 826.4 g. of $Bi_2O_3$ and 3.912 g. of $TiO_2$ were weighed and put in a Pt crucible; they were thereafter fused at approximately 1000° C. and stirred to be homogenized; the temperature was decreased at 120° C./h and stabilized in an over-saturated state at 823° C. Then, a CaMgZr-substituted GGG single crystal substrate having a diameter of two inches was rotated for 43 hours at 100 r.p.m to cause liquid phase epitaxial growth of a magnetic garnet single crystal film, which provided a single crystal film having a thickness of 520 μm. The surface of the magnetic garnet single crystal film was in a mirror state, and no crack had occurred on the same.

The resultant single crystal film had a composition expressed by $Bi_{1.20}Tb_{1.03}Yb_{0.73}Pb_{0.04}Fe_{4.96}Ti_{0.02}Pt_{0.02}O_{12}$, as shown in Table 1, when analyzed using the fluorescent X-ray method. A Faraday rotator to be used for light having a wavelength of 1620 nm was fabricated by lapping the magnetic garnet single crystal film such that it would have a Faraday rotation angle of 45 deg. for a wavelength of 1620 nm, attaching non-reflective films on both sides thereof, and cutting it into 3 mm squares. No crack occurred on the single crystal film in either the lapping process or the cutting process. An evaluation on the Faraday rotation coefficient, insertion loss and the temperature characteristic of the Faraday rotator indicated that it had a thickness of 415 μm, a Faraday rotation coefficient of 0.1082 deg./μm, an insertion loss of 0.29 dB at the maximum and 0.25 dB at the minimum and a temperature characteristic of 0.055 deg./° C.

Comparative Example 2

5.330 g. of $Eu_2O_3$, 8.072 g. of $Lu_2O_3$, 43.214 g. of $B_2O_3$, 146.18 g. of $Fe_2O_3$, 1189.6 g. of PbO, 826.4 g. of $Bi_2O_3$ and 4.294 g. of $TiO_2$ were weighed and put in a Pt crucible; they were fused at approximately 1000° C. and stirred to be homogenized; the temperature was decreased at 120° C./h and stabilized in an over-saturated state at 835° C. Then, a CaMgZr-substituted GGG single crystal substrate having a diameter of two inches was rotated for 48 hours at 100 r.p.m to cause liquid phase epitaxial growth of a magnetic garnet single crystal film, which provided a single crystal film having a thickness of 590 μm. A great number of cracks in the form of concentric circles occurred on the periphery of the surface of the magnetic garnet single crystal film.

The resultant single crystal film had a composition expressed by $Bi_{0.90}Eu_{1.22}Lu_{0.84}Pb_{0.04}Fe_{4.96}Ti_{0.02}Pt_{0.02}O_{12}$, as shown in Table 1, when analyzed using the fluorescent X-ray method. A Faraday rotator to be used for light having a wavelength of 1620 nm was fabricated by lapping the magnetic garnet single crystal film such that it would have a Faraday rotation angle of 45 deg. for a wavelength of 1620 nm, attaching non-reflective films on both sides thereof, and cutting it into 3 mm squares. Cracks occurred also at the step of the lapping process, and the number of available 3 mm square Faraday rotators was approximately one half the quantity available when no crack occurs. An evaluation of the Faraday rotation coefficient, insertion loss and the temperature characteristic of the Faraday rotator indicated that it had a thickness of 490 μm, a Faraday rotation coefficient of 0.0918 deg. /μm, an insertion loss of 0.10 dB at the maximum and 0.08 dB at the minimum and a temperature characteristic of 0.065 deg./° C.

Comparative Example 3

10.915 g. of $Ho_2O_3$, 7.664 g. of $Lu_2O_3$, 43.214 g. of $B_2O_3$, 184.74 g. of $Fe_2O_3$, 8.879 g. of $Al_2O_3$, 1189.6 g. of PbO, 826.4 g. of $Bi_2O_3$ and 4.294 g. of $TiO_2$ were weighed and put in a Pt crucible; they were thereafter fused at approximately 1000° C. and stirred to be homogenized; the temperature was decreased at 120° C./h and stabilized in an over-saturated state at 786° C. Then, a CaMgZr-substituted GGG single crystal substrate having a diameter of two inches was rotated for 35 hours at 100 r.p.m to cause liquid phase epitaxial growth of a magnetic garnet single crystal film. However, deposition of garnet occurred in the fusing agent in addition to epitaxial growth, and the achieved film thickness was only 280 μm. Although the magnetic garnet single crystal film had no crack on the surface thereof, a great number of defects attributable to the deposition of garnet in the fusing agent were observed.

The resultant single crystal film had a composition expressed by $Bi_{1.60}Ho_{0.70}Lu_{0.66}Pb_{0.04}Fe_{4.46}Al_{0.50}Ti_{0.02}Pt_{0.02}O_{12}$, as shown in Table 1, when analyzed using the fluorescent X-ray method. The single crystal film could not be processed into a Faraday rotator for the L-band (wavelengths in the range from 1570 nm to 1620 nm) because of the insufficient thickness.

TABLE 1

COMPOSITIONS OF Bi-SUBSTITUTED RARE EARTH IRON GARNET FILM AND RESULTS OF EVALUATION

| | COMPOSITION | CRACKS DURING GROWTH | CRACKS DURING LAPPING | INSERTION LOSS (dB) (WAVELENGTH) |
|---|---|---|---|---|
| EXAMPLE 1 | $Bi_{1.20}Gd_{0.78}Yb_{0.98}Pb_{0.04}Fe_{4.96}Ge_{0.02}Pt_{0.02}O_{12}$ | NONE | NONE | 0.06–0.10 (1600 nm) |
| EXAMPLE 2 | $Bi_{1.00}Eu_{1.08}Lu_{0.83}La_{0.05}Pb_{0.04}Fe_{4.96}Ti_{0.02}Pt_{0.02}O_{12}$ | NONE | NONE | 0.07–0.10 (1620 nm) |
| EXAMPLE 3 | $Bi_{1.40}Ho_{0.45}Y_{0.51}Lu_{0.60}Pb_{0.04}Fe_{4.96}Si_{0.02}Pt_{0.02}O_{12}$ | NONE | NONE | 0.05–0.09 (1570 nm) |
| EXAMPLE 4 | $Bi_{1.50}Ho_{0.75}Y_{0.71}Pb_{0.04}Fe_{4.46}Ga_{0.30}Al_{0.20}Ge_{0.02}Pt_{0.02}O_{12}$ | NONE | NONE | 0.08–0.10 (1570 nm) |
| COMPARATIVE EXAMPLE 1 | $Bi_{1.20}Tb_{1.03}Yb_{0.73}Pb_{0.04}Fe_{4.96}Ti_{0.02}Pt_{0.02}O_{2}$ | NONE | NONE | 0.25–0.29 (1620 nm) |
| COMPARATIVE EXAMPLE 2 | $Bi_{0.90}Eu_{1.22}Lu_{0.84}Pb_{0.04}Fe_{4.96}Ti_{0.02}Pt_{0.02}O_{12}$ | CRACKS | CRACKS | 0.08–0.10 (1620 nm) |
| COMPARATIVE EXAMPLE 3 | $Bi_{1.60}Ho_{0.70}Lu_{0.66}Pb_{0.04}Fe_{4.46}Al_{0.50}Ti_{0.02}Pt_{0.02}O_{12}$ | NONE | LAPPING DISABLE | — |

As described above, the present invention makes it possible to provide a magnetic garnet material which is subjected to less cracks during the growth and lapping of the single crystal film, and to provide a Faraday rotator having an insertion loss characteristic of 0.1 dB or less in the waveband from 1570 to 1620 nm.

What is claimed is:

1. A magnetic garnet material characterized in that it is expressed by a general formula:

$$Bi_aM1_{3-a}Fe_{5-b}M2_bO_{12}$$

wherein M1 includes Pb and at least one kind of element that is selected from among Y, La, Eu, Gd, Ho, Yb and Lu; M2 includes Pt and at least one kind of element that is selected from among Ga, Al, Ti, Ge and Si; and a and b satisfy $1.0 \leqq a \leqq 1.5$ and $0 \leqq b \leqq 0.5$, respectively.

2. A magnetic garnet material according to claim 1, characterized in that said material is grown by liquid phase epitaxial growth method.

3. A magnetooptical device having a Faraday rotation angle θ expressed by $44deg. \leqq \theta \leqq 46deg.$ when light having a predetermined wavelength λ impinges thereupon, wherein the value of λ is within the range of 1570 nm to 1620 nm, characterized in that it is formed of a magnetic garnet material according to claim 1.

4. A magnetooptical device according to claim 3, characterized in that it has an insertion loss of 0.1 dB or less when light having said wavelength λ impinges thereupon.

* * * * *